June 3, 1930.  G. D. WHITE  1,761,696
INSULATION FOR HEATING VESSELS
Filed Dec. 15, 1928  2 Sheets-Sheet 2

Inventor
George D. White
By his Attorney
R. J. Dearborn

Patented June 3, 1930

1,761,696

UNITED STATES PATENT OFFICE

GEORGE D. WHITE, OF PORT ARTHUR, TEXAS, ASSIGNOR TO THE TEXAS COMPANY, OF NEW YORK, N. Y., A CORPORATION OF DELAWARE

INSULATION FOR HEATING VESSELS

Application filed December 15, 1928. Serial No. 326,400.

This invention relates to improved means for insulating exposed portions of the shells of heating vessels such as petroleum stills and the like partially inclosed within a furnace and relates more specifically to improved means for insulating exposed portions of substantially horizontal heating vessels and sealing the spaces between furnace walls and the heating vessel.

Ordinarily heating vessels or stills of the horizontal type are cylindrical and are elevated above the ground with furnaces disposed beneath the vessels. Closure walls for the furnace usually serve also to support the heating vessel. The upper limits of the side walls of such a structure as this usually run parallel to the longitudinal axis of the heating vessel and preferably extend upwardly slightly beyond the center line or axis of the vessel which rests between the side walls and in most cases the side walls support the vessel. The end walls of the structure are extended upwardly within the end limits of the vessel itself and their tops are formed cradle-like to follow the periphery of the underside of the vessel near its ends but leaving a curvilinear space between the top of the wall and the underside of the vessel, to provide for expansion of the vessel and for irregularities of size and shape of the vessel. A space of sufficient size to provide for proper clearance of the vessel should be sealed in some manner to exclude air, the normal ingress of which of course should be closely controlled as by means of a damper when operating the furnace.

Therefore one of the objects of the present invention is to provide adequate means for sealing the space between the peripheral wall of the vessel and the cradle formed by the end walls of the furnace, while another is to provide means for insulating excluded portions of the vessel itself.

These and other objects of the invention may be better understood from the following detailed description and the accompanying drawing showing a preferred embodiment of the invention in which.

Figure 1:
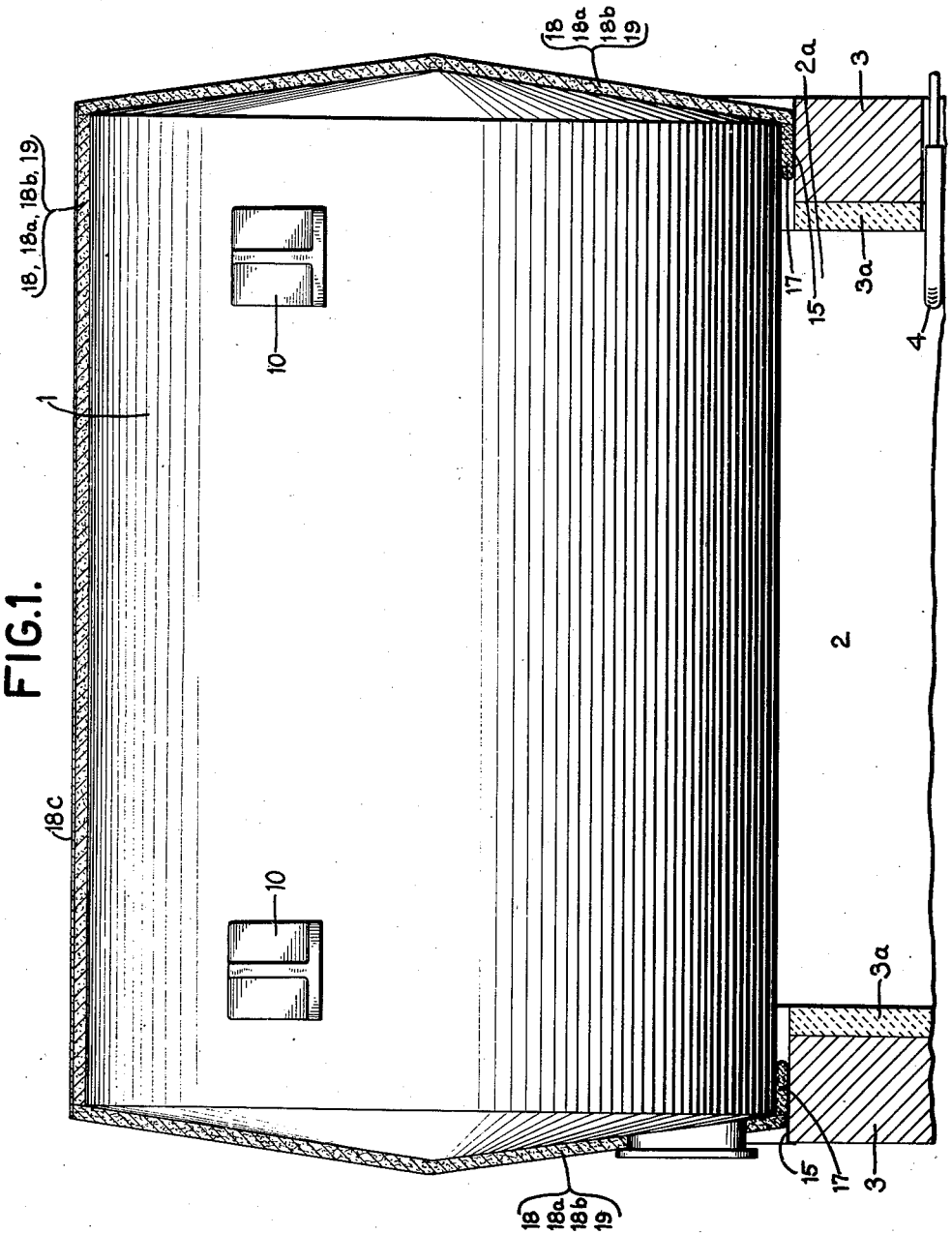
Fig. 1 is a longitudinal sectional view through the furnace and insulation showing the vessel outlined.

Referring now to the drawing and particularly to Fig. 1, a substantially horizontal heating vessel 1 preferably cylindrical in cross section is disposed in an appropriate setting composed of side walls 2 and end walls 3. The side walls 2 and end walls 3 which are appropriately lined with refractory material $2^a$ and $3^a$ serve an additional purpose in that they are also closure walls forming a furnace disposed below the heating vessel 1 which is fired by a burner 4.

Ordinarily in the construction of furnaces it is customary to make the setting of masonry such as red brick and line the furnace interiorly with fire brick. In the present case the side walls 2 are separated sufficiently to permit the vessel 1 to rest loosely between them and they are extended upwardly so that their upper limits, which are in a substantially horizontal plane, are slightly above the longitudinal center line or axis of the vessel 1. The heating vessel 1 is provided with a plurality of lugs 10 situated slightly above the longitudinal axis of the vessel which lugs rest upon the side walls 2 of the furnace thereby supporting the vessel 1.

The end walls 3 bonded to the side walls 2 are extended upwardly within the end limits of the vessel 1 and their tops are formed so as to loosely cradle the vessel 1 near its ends. The term "loosely cradle" is meant to imply that a curvilinear space of two or two and one-half inches is left betwee the periphery of a vessel say fourteen feet in diameter and forty-two feet long and the cradle formed by the end wall. This is to insure against any bearing being taken upon the end walls 3 by the vessel 1 when the vessel 1 is being erected due to irregularities of size or shape of new vessels or when the vessel is being heated due to expansion of the circumferential size of the vessel or in case the side bearing walls 2 settle slightly due to the imposed load. Such a space is varied according to the size of a vessel or in pressure vessels it may be varied according to the size of rivet heads or the thickness of plates of which the vessel is built which may be lapped at the seams.

Figure 2:
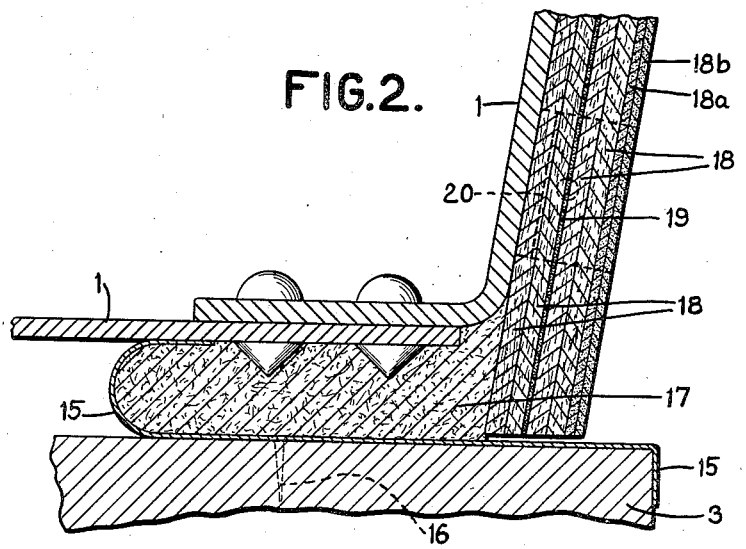
Fig. 2 is an enlarged fragmentary detail view in cross section taken on the line 2—2 of Fig. 3.
Figure 3:
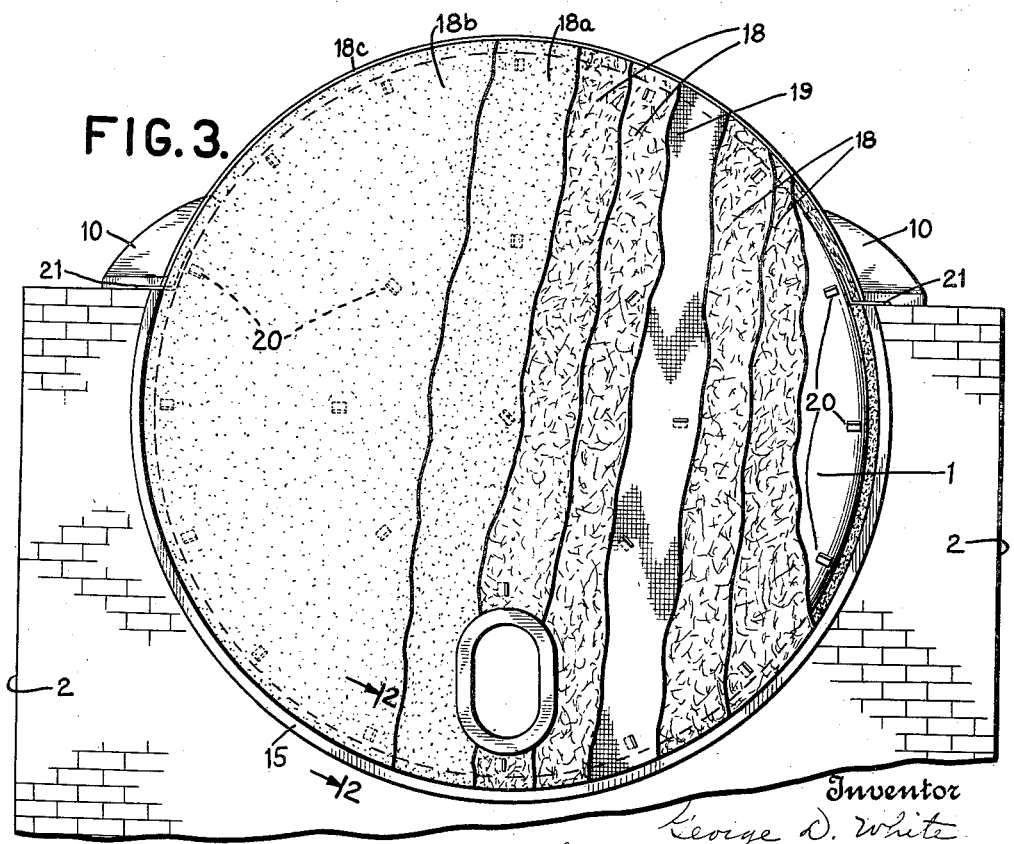
Fig. 3 is an end view in elevation of a heating vessel in its setting showing the insulation partially torn away.

Referring now to Fig. 2 an elongated sheet of metal 15 is shaped hollowly as a resilient molding to fit snugly in and substantially seal the curvilinear space left between the walls 3 and the vessel 1 and is securely held to the wall by means of anchorages 16, and of a turned down edge of the resilient molding 15 which overlaps the outer edges of the walls 3. Suitable plastic material 17 consisting of asbestos and magnesia or the like is then applied into the sealed space in such amount as to completely fill the sheet metal molding 15. Thus the hollow metal molding 15 while still retaining its resiliency also encases an insulating material.

The upper portion of the vessel 1 which is excluded from the furnace is insulated with a suitable number of layers of fire-felt or another suitable insulating material 18 which may be applied individually in layers until a desired thickness is had when one or two coats of appropriate thickness of a plastic material 18$^a$ consisting preferably of asbestos fibre and Portland cement or the like are applied. In order to make the blanket of insulating materials thus formed more substantial a layer of hardware cloth or wire mesh or expanded metal 19 is inserted between some two layers of the insulating material 18 and to protect the surface of the insulating material it is customary to place sheet meal covering 18$^c$, corrugated or flat, over the entire upper portion.

In providing for the circumferential expansion of the vessel 1 and for irregularities of size and shape suitable clearance spaces are left between the side walls 2 and the vessel 1. It will be seen that the blanket of insulating materials which covers the upper excluded portion of vessel 1 may well be arranged along the upper limits of the walls 2 adjacent the vessel 1 to adequately cover or seal these spaces with the aid of a metal flashing 21.

The end portions of the vessel 1 naturally present a more difficult problem than the upper portion in so far as securing the insulating material is concerned. Therefore in order to substantially secure the insulating materials a number of clips 20 formed preferably of angle iron are welded to the ends of the vessel at appropriate intervals. The outstanding leg of each of the angles 20 has a perforation for the purpose of securing thereto wire or other securing means for the layers of insulation. The insulating of the ends is carried out in substantially the same manner as that of the upper portion of the vessel 1, that is, a desired number of layers of fire-felt or the like 18 are applied separately to each end of the vessel 1. A hardware cloth or mesh wire or expanded metal 19 or the like is extended tautly over the entire end surface and secured through the previously applied layers of insulating material 18 to the clips 20, after which additional layers of insulating material 18 may be applied and secured to the wire mesh 19 as desired. When a sufficient number of layers of insulating material 18 have been applied one or more plastic coats of asbestos fiber and Portland cement or the like 18$^a$ may be applied and over this may be applied a coat of asphalt and asbestos fiber mixture 18$^b$ which serves to keep out moisture and otherwise protects the insulating materials from the effects of the weather.

The insulating material 18, 18$^a$ and 18$^b$ is extended beyond the peripheral limits of the ends of the heating vessel 1 where adjacent the end walls 3 and to within close proximity of the walls 3. While individual layers of the insulating materials are also extended beyond the peripheral limits of the ends of the vessel 1 in the upper excluded portion where not adjacent to the walls 3 this is done for the purpose of lapping the layers covering the upper portion with the layers covering the end portions thus to form a bond between the laminated insulation of the individual portions of the vessel 1.

It is desired that the present invention be not limited by the preferred embodiment as illustrated and described herein but rather that it be limited only by the claims which follow.

I claim:

1. In a horizontal heating vessel with a lower portion included in a furnace and end portions and an upper portion excluded therefrom, furnace walls supporting said vessel, means for insulating the excluded portions comprising a plurality of layers of insulating materials extended entirely over said excluded portions, clips secured to said end portions, a layer of wire mesh extended over the end portions and the upper portion of the vessel between layers of insulating material and secured on the end portions to said clips.

2. In a horizontal heating vessel with a lower portion included in a furnace and end portions and an upper portion excluded therefrom, substantially vertical end furnace walls which loosely cradle the underside of the vessel near its ends leaving curvilinear spaces, means insulating the end portions and the upper portion, means insulating the ends extending beyond the peripheral limits of the ends where adjacent the cradle walls to within close proximity of said walls and means sealing the curvilinear spaces between the furnace walls and the underside of the vessel.

3. In a horizontal heating vessel with a lower portion included in a furnace and end portions and an upper portion excluded therefrom, substantially vertical end furnace walls which loosely cradle the underside of the vessel near its ends leaving curvilinear spaces, means insulating the end portions and the upper portion, means insulating the ends extending beyond the peripheral limits of the ends where adjacent the cradle walls to within close proximity of said walls and resilient metal molding secured to the masonry wall sealing the curvilinear spaces between the walls and the underside of vessel.

4. In a horizontal heating vessel with a lower portion included in a furnace and end portions and an upper portion excluded therefrom, substantially vertical end furnace walls which loosely cradle the underside of the vessel near its ends leaving curvilinear spaces, means insulating the end portions and the upper portion, means insulating the ends extending beyond the peripheral limits of the ends where adjacent the cradle walls to within close proximity of said walls, resilient metal molding shaped to fit in said curvilinear spaces, elongated pads of insulating material encased in said molding and secured to the masonry wall sealing the curvilinear spaces between the walls and the underside of vessel.

In witness whereof I have hereunto set my hand this 16th day of November, 1928.

GEORGE D. WHITE.